United States Patent
Kim et al.

(10) Patent No.: US 11,430,248 B2
(45) Date of Patent: Aug. 30, 2022

(54) OPTICAL FINGERPRINT RECOGNITION SYSTEM AND MOBILE DEVICE COMPRISING THE SAME

(71) Applicant: LG CHEM, LTD., Seoul (KR)

(72) Inventors: Jae Jin Kim, Daejeon (KR); Dae Han Seo, Daejeon (KR); Min Soo Song, Daejeon (KR); Bu Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/257,477

(22) PCT Filed: Jul. 16, 2019

(86) PCT No.: PCT/KR2019/008753
§ 371 (c)(1),
(2) Date: Dec. 31, 2020

(87) PCT Pub. No.: WO2020/017858
PCT Pub. Date: Jan. 23, 2020

(65) Prior Publication Data
US 2021/0124900 A1   Apr. 29, 2021

(30) Foreign Application Priority Data
Jul. 17, 2018 (KR) ................ 10-2018-0082701

(51) Int. Cl.
*G06K 9/00* (2022.01)
*G02B 5/20* (2006.01)
*G06V 40/13* (2022.01)

(52) U.S. Cl.
CPC ............. *G06V 40/13* (2022.01); *G02B 5/208* (2013.01)

(58) Field of Classification Search
CPC ................................ G06V 40/13; G02B 5/208
See application file for complete search history.

(56) References Cited

U.S. PATENT DOCUMENTS

| | | | |
|---|---|---|---|
| 2010/0172552 A1 | 7/2010 | Wu | |
| 2017/0083745 A1* | 3/2017 | Goodelle | G06V 40/1329 |
| 2017/0118551 A1* | 4/2017 | Wagner | A61B 5/6898 |
| 2017/0372152 A1* | 12/2017 | Baek | G06V 40/1394 |
| 2018/0365475 A1* | 12/2018 | Lee | H05K 1/111 |
| 2019/0050094 A1* | 2/2019 | Zeng | G06F 3/0412 |
| 2019/0310724 A1* | 10/2019 | Yeke Yazdandoost | G06V 40/1318 |

FOREIGN PATENT DOCUMENTS

| | | |
|---|---|---|
| EP | 3239824 A1 | 11/2017 |
| KR | 10-2016-0090313 A | 7/2016 |
| KR | 10-2017-0101285 A | 9/2017 |
| KR | 10-2017-0119623 A | 10/2017 |
| KR | 10-2018-0059720 A | 6/2018 |
| KR | 10-2018-0073763 A | 7/2018 |
| WO | 2017129126 A1 | 8/2017 |

\* cited by examiner

*Primary Examiner* — Lixi C Simpson
(74) *Attorney, Agent, or Firm* — Dentons US LLP

(57) ABSTRACT

The present application relates to an optical fingerprint recognition system and a mobile device comprising the same. The optical fingerprint recognition system is used without changing the original structure or configuration of the mobile device because it has a simple structure and a compact size. The optical fingerprint recognition system and the mobile device having excellent user identification or authentication capability through fingerprints are provided.

20 Claims, 3 Drawing Sheets

OPTICAL FINGERPRINT RECOGNITION SYSTEM AND MOBILE DEVICE COMPRISING THE SAME

CROSS-REFERENCE TO RELATED APPLICATIONS

This application is a National Stage Application of International Application No. PCT/KR2019/008753 filed on Jul. 16, 2019, which claims the benefit of priority based on Korean Patent Application No. 10-2018-0082701 filed on Jul. 17, 2018, the disclosure of which is incorporated herein by reference in its entirety.

TECHNICAL FIELD

The present application relates to an optical fingerprint recognition system and a mobile device comprising the same.

BACKGROUND ART

Depending on generalization and use frequency increase of mobile devices such as smart phones and tablet PCs, security of these devices has been becoming more important. Biological information of a user, for example, fingerprint, iris, face, or voice, can be used to identify or authenticate a device user for security maintenance.

In the case of using a fingerprint as biological information, typical fingerprint recognition methods may include an optical method and an electrostatic capacity method. Among them, optical fingerprint recognition can be divided into a scattering method and a total reflection method. The former is a method of detecting light scattered in a ridge portion of a fingerprint in direct contact with a transparent fingerprint contact part of the device, and the latter is a method of detecting light totally reflected from the surface of a fingerprint contact part corresponding to a valley portion of a fingerprint. In the case of the scattering method, since light to be scattered must be detected, it may be difficult to provide a light quantity sufficient to identify the fingerprint pattern to the sensor, and the path of the scattered light may overlap the light path of the original light source, so that there is a problem that the contrast is lowered. In the case of the total reflection method, it is possible to secure a relatively larger light quantity than that of the scattering method, but when the total reflection path is long, there is a problem that the contrast may be lowered while the totally reflected lights interfere with each other.

Recently, mobile devices, in which a bezel part of the device front (user screen viewer side) is equipped with a fingerprint recognition part in the bezel portion of the front of the device (user screen viewer side), have been commercially successful. However, the configuration in which the bezel part comprises the fingerprint recognition part is inconsistent with the large area of the display or the bezel-less trend. In the case of mobile devices, in which the device back is equipped with a fingerprint recognition part, they are consistent with the large area or the bezel-less trend, but for fingerprint authentication through these devices, this is inconvenient in that the user's more unnatural or additional behaviors than the case where the device front is equipped with a fingerprint recognition part are required.

On the other hand, in the case of mobile devices, it is important to secure a compact size and portability. Therefore, even when the optical fingerprint recognition method is introduced, the configuration for securing the light path needs not to excessively increase the volume of the entire device. In addition, due to the addition of the configuration used for fingerprint recognition, it is not preferable to increase the manufacturing cost of the mobile device as the original structure or configuration of the device is changed.

DISCLOSURE

Technical Problem

It is one object of the present application to provide an optical fingerprint recognition system that can recognize or detect fingerprint information according to a total reflection method.

It is another object of the present application to provide an optical fingerprint recognition system capable of fingerprint recognition in a display region of a display panel without degrading the image quality of the display.

It is another object of the present application to provide an optical fingerprint recognition system that can be used without changing the original structure or configuration of a mobile device because it has a simple structure and a compact size.

It is another object of the present application to provide an optical fingerprint recognition system capable of recognizing or detecting high contrast fingerprint information.

It is another object of the present application to provide a bezel-less type mobile device comprising the fingerprint recognition system.

The above objects of the present application and other objects can be all solved by the present application which is described in detail below.

Technical Solution

In order to solve the above-described problems of the prior art and to achieve the above objects, the present application provides a fingerprint recognition system comprising a display panel having a fingerprint contact part, and a fingerprint recognition chip attached to the display panel. The fingerprint contact part is formed on the side of a display part in the display panel. The fingerprint recognition chip comprises a light control layer and an intermediate layer. Then, the light control layer comprises a first light control part for converting light incident from the outside into light that can be totally reflected to the fingerprint contact part of the display panel, and a second light control part for transferring the totally reflected light to a sensor part.

Advantageous Effects

According to one example of the present application, an optical fingerprint recognition system that can be applied to a mobile device without changing the original structure or configuration of the mobile device can be provided because it has a simple structure and a compact size. In addition, the system can recognize a fingerprint in contact with the screen display part without degrading the image quality of the display. Accordingly, the mobile device comprising the system has excellent user identification or authentication capability without increasing manufacturing costs when compared to the mobile device with conventional fingerprint recognition function.

Figure 1:
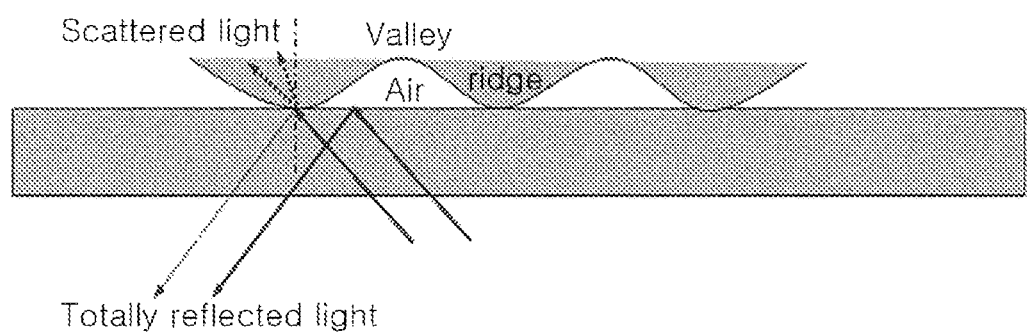
FIG. 1 schematically shows an optical fingerprint recognition method using total reflection. In the case of optical fingerprint recognition using total reflection as in FIG. 1, when the fingerprint contacts the display part of the display panel, light can be totally reflected at the interface of the display panel corresponding to the valley portion of the fingerprint, and the totally reflected light can be detected by the sensor.

Hereinafter, a system according to one example of the present application and a device comprising the same will be described in detail with reference to the accompanying drawings. For ease of explanation, the size or shape of each constitution shown may be exaggerated or reduced.

100: display panel
110: fingerprint contact part
120: display part
120': fingerprint recognition region in display part
130: non-display part
200: fingerprint recognition chip
210: intermediate layer
220: light control layer
221: first light control part
222: second light control part
300: light source part
400: sensor part

BEST MODE

In one example of the present application, the present application relates to an optical fingerprint recognition system. The system has a predetermined configuration such that optical fingerprint recognition can be performed using a total reflection method. For example, as described below, the system of the present application is configured such that the light provided from a light source can be transmitted to a fingerprint contact part of a display panel, and the light totally reflected from the fingerprint contact part can be transmitted to a sensor.

Figure 2A:
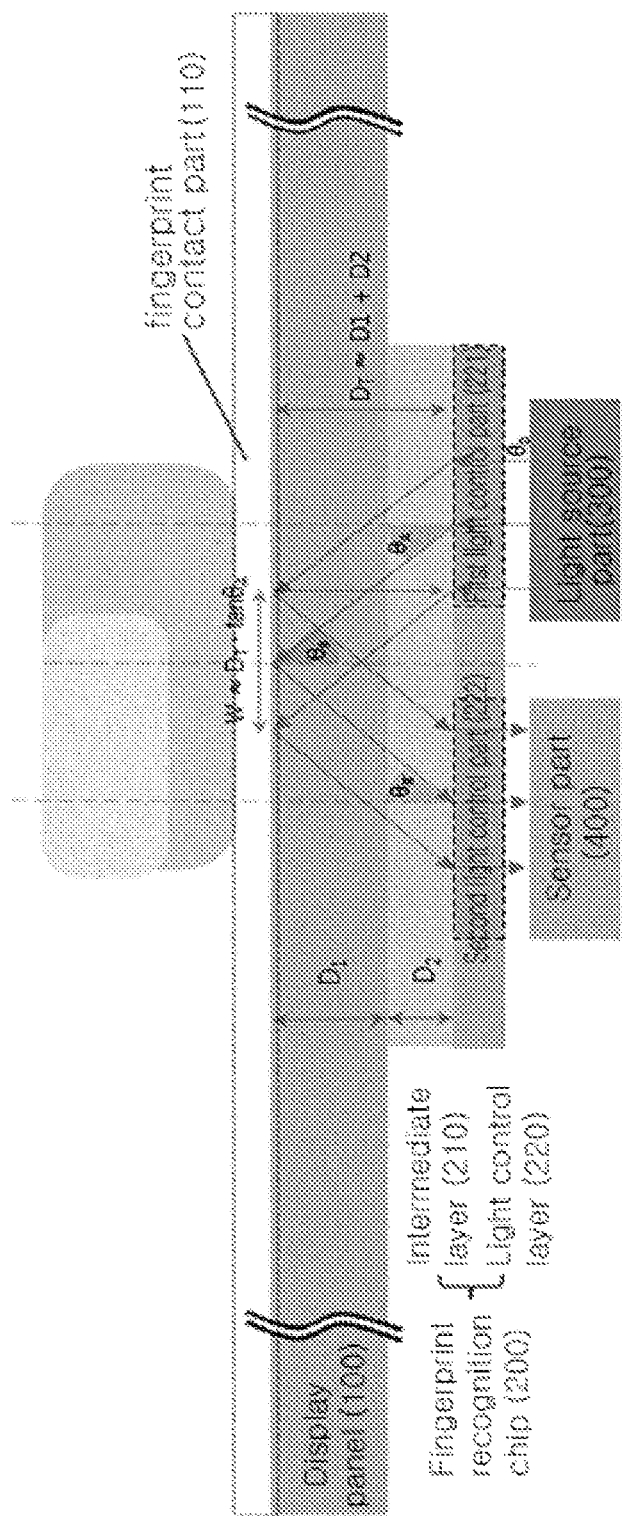
FIG. 2 schematically shows an optical fingerprint recognition chip according to one example of the present application and a device comprising the same. Specifically, FIG. 2(a) schematically shows a cross section of a system and a device of the present application, and FIG. 2(b) exemplarily shows a fingerprint recognition region formed on a display part other than a non-display part.
Figure 2B:
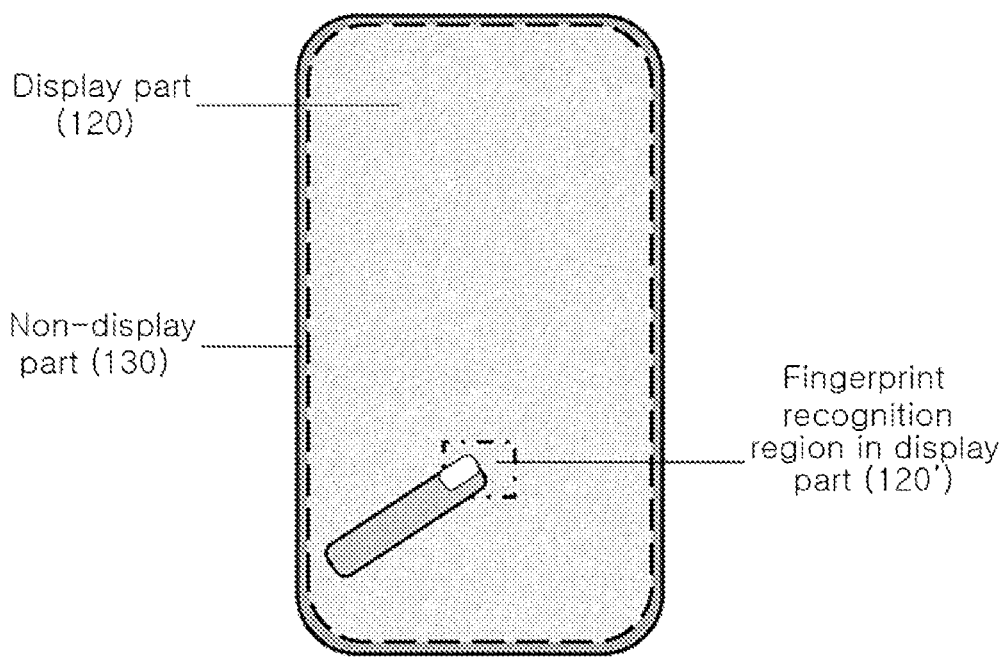

In this regard, FIG. 1 schematically explains a total reflection method of detecting light totally reflected from an interface of a display panel corresponding to a valley portion of a fingerprint when the fingerprint is contacted on a display part of the display panel, and FIG. 2 schematically shows a cross section of an optical fingerprint recognition (or input) chip according to one example of the present application and a device comprising the same. The invention of the present application will be described with reference to FIGS. 1 and 2 as follows.

The system of the present application comprises a display panel including a fingerprint contact part, and a fingerprint recognition chip attached to the display panel.

The fingerprint recognition chip used in the system of the present application has a configuration attached to the back of the completed display panel. In Korean Patent Application Nos. 10-2017-0147008 and 10-2017-0147033 related to the fingerprint recognition device, the inventors of the present application have proposed inventions that a configuration providing an essential light path used for fingerprint recognition is positioned between a display panel and a screen part (display part) which is a fingerprint contact part.

In the case of the above application inventions, there is an advantage that the fingerprint recognition can be made in a large area, but as the configurations for fingerprint recognition are involved in the manufacturing process of the display panel including the screen part, there are problems that the manufacturing process becomes complicated, the manufacturing cost increases and an unexpected change in image quality of the display occurs. In view of this point, the present application provides a fingerprint recognition system that the manufacturing process is simple because the chip configuration used for fingerprint recognition is not involved in the manufacturing process of the display panel, the image quality change of the display does not occur, and it is easily mass-produced because it is manufactured by attaching the completed fingerprint chip to the completed display panel.

The fingerprint contact part of the display panel may be located at the side of the screen part or the display part where the user can visually recognize the screen in the display panel. In addition, a fingerprint recognition region, in which a user's fingerprint may be actually contacted to participate in providing a light path related to fingerprint recognition, may exist in a part of a region of the fingerprint contact part. That is, in the present application, the fingerprint contact part may be a display part, and the fingerprint recognition region, which is a part of the region of the fingerprint contact part, may be one region of the display part. In other words, the system of the present application does not have a region related to fingerprint recognition in the bezel region, but comprises the fingerprint contact part as a display part region of the display panel in which a shape or pattern implemented through the display panel is displayed.

The fingerprint recognition chip comprises a light control layer and an intermediate layer.

The light control layer comprises two regions providing a light path required for fingerprint recognition, that is, a first light control part and a second light control part. The light control parts may be a configuration provided to perform a predetermined function only on light incident at a specific angle. That is, the light control part may convert some or all of the incident light into output light having a different angle from the incident light. For example, as described below, the first light control part may provide the light incident on the lower surface of the first light control part to the upper surface of the first light control part as it is or may convert it into light having a different angle to provide it thereto. In addition, as described below, the second light control part may provide the light having a specific angle incident on the upper surface of the second light control part to the lower surface of the second light control part as it is or may convert it into light having a different angle to provide it thereto. In the present application, the "upper surface" may mean a surface close to the fingerprint contact part of the display panel based on the thickness direction among the surfaces of the specific layer configuration, and the "lower surface" may mean a surface located in the opposite direction to the surface called the upper surface among the surface configurations of the specific layer configuration. The lower surface and the upper surface may be referred to as a light incident surface or an incident surface and a light transmitting surface or a transmitting surface according to a traveling path of light, respectively.

Specifically, as in FIG. 2(a), the first light control part may be provided so that light ($L_O$) incident from the lower surface of the first light control part at a first angle ($\theta_O$) is transmitted as light ($L_A$) having a second angle ($\theta_A$) equal to or different from the first angle ($\theta_O$) toward the intermediate layer. In one example, the transmitting surface of the first light control part from which the light of the second angle ($\theta_A$) is transmitted may be another surface except for the lower surface of the first light control part or any region inside. More specifically, the system of the present application may be configured such that light of the second angle ($\theta_A$) may be transmitted from the side surfaces and/or the upper surface of the first light control part, or any region and/or point inside the first light control part. In the present application, the angle is an angle formed by the traveling direction of light from the normal to the layer (or light incident layer or light incident surface) placed on the horizontal plane, and its unit is ° (degree), which may have more than 0° to less than 90°. Furthermore, the angle that the light has may be referred to as an incident angle or an exit angle depending on the relative position of each constitution along the traveling direction of light. The light of the second angle ($\theta_A$) may be provided by the first light control part toward the display panel positioned on the light control layer, specifically toward the intermediate layer, and more specifically, to the lower surface of the intermediate layer.

As in FIG. 2(a), the second light control part may be provided so that light ($L_{B'}$) incident on the upper surface of the second light control part at a fourth angle ($\theta_{B'}$) is transmitted to the lower surface of the second light control part. In one example, the transmitting surface of the second light control part from which the light incident at the fourth angle ($\theta_{B'}$) is transmitted may be another surface of the second light control part except for the upper surface of the second light control part or any region inside. More specifically, the system of the present application may be configured such that the light incident on the second light control part at the fourth angle ($\theta_{B'}$) may be transmitted from the side surfaces and/or the lower surface of the second light control part, or any region and/or point inside the second light control part. As described below, the light totally reflected at the fingerprint contact part interface to reach the upper surface of the second light control part can be transmitted to the sensor part by the second light control part and can be used for fingerprint identification.

As described above, the light control layer of the present application can be divided into two parts that can control the angle or the path of the light differently from each other, and thus can provide the light path as in FIG. 2(a).

In the present application, the light of the second angle ($\theta_A$) generated by the first light control part may be used for fingerprint recognition after passing through the light path as described below. In order to be used for fingerprint recognition, the light of the second angle ($\theta_A$) transmitted from the first light control part must reach the surface layer (fingerprint contact part) of the display panel where fingerprints touch by being transmitted through the intermediate layer without being totally reflected at the interface between the intermediate layer and the light control layer. That is, the system of the present application may be provided so that the light of the second angle ($\theta_A$) may be transmitted through the intermediate layer.

In one example, when the refractive indices of the light control layer and the intermediate layer are different, more specifically, when the refractive index of the light control layer is larger than that of the intermediate layer, the light of the second angle ($\theta_A$) in the system of the present application can satisfy the following relational expression 2. More specifically, with respect to the second angle ($\theta_A$), the system of the present application may be provided such that the light of the second angle ($\theta_A$) transmitted from the first light control part satisfies the following relational expression 2 to be transmitted through the lower surface of the intermediate layer and the intermediate layer. The following relational expression can be obtained using Snell's law.

$$\theta_A < (180°/\pi) \times \sin^{-1}(n_2/n_3)$$ [Relational Expression 2]

Relational Expression 2 above exemplarily defines the condition that the light of the second angle ($\theta_A$) from the first light control part of the light control layer toward the intermediate layer is not totally reflected from the lower surface of the intermediate layer (or the interface between the intermediate layer and the light control layer). That is, Relational Expression 2 above means a condition that the light of the angle ($\theta_A$) transmitted from the first light control part can be transmitted through the lower surface of the intermediate layer or the intermediate layer. In Relational Expression 2 above, $n_2$ is the refractive index of the intermediate layer, and $n_3$ is the refractive index of the first light control part or the second light control part in the light control layer. At this time, the sizes of $n_3$ and $n_2$ may be the same or different, and in one example, $n_3$ may be larger than $n_2$.

In one example, the first light control part and the second light control part may be included in the chip while forming one layer.

The fingerprint recognition system further comprises an intermediate layer. Specifically, the system may sequentially comprise an intermediate layer and a light control layer on the opposite surface of a surface of the display panel having the fingerprint contact part. In the present application, the term "on" or "above" used in connection with the interlayer lamination position may mean including not only the case where a constitution is formed directly on another constitution but also the case where a third constitution is interposed between these constitutions.

In one example, the intermediate layer may be a transparent layer. Unless otherwise specified, the term "transparent" as used in connection with the properties of a layer in the present application means a case where the transmittance for visible light having a wavelength of 380 nm to 780 nm is 65% or more, 70% or more, 75% or more, 80% or more, 85% or more, 90% or more, or 95% or more. The upper limit of transmittance is about 100%, which may be less than 100%.

The intermediate layer may be provided so as to be capable of securing a region where a fingerprint is recognized on the fingerprint contact part.

For example, in the system of the present application, the intermediate layer has a thickness satisfying the following relational expression 1.

$$W = (D1 + D2) \times \tan(\theta_A)$$ [Relational Expression 1]

In Relational Expression 1 above, W is a one direction length of a region where fingerprint recognition is made in the system, D1 is the thickness of the display panel, and D2 is the thickness of the intermediate layer.

In relation to Relational Expression 1 above, the symbol "=" may be used as a meaning including the symbol "≈" about an approximation value or the wavy symbol described about W, etc. in FIG. 2a.

In relation to Relational Expression 1 above, W is a length in at least one direction forming an area of a region where fingerprint recognition is made, that is, a fingerprint recognition region.

The intermediate layer satisfying Relational Expression 1 above may extend the one direction length of the fingerprint contact part region, more specifically, the fingerprint recognition region, which is involved in providing a light path required for fingerprint recognition. For example, in the case of being no intermediate layer (D2=0), the value of W, which is the one direction length of the fingerprint contact part used for fingerprint recognition in FIG. 1, depends only on the display panel, and as a result, the one direction length of the region where fingerprint recognition is made, W (=D1×tan($\theta_A$)) is reduced than in the case of being the intermediate layer. In consideration of the demand increase for thin display panels, the absence of the intermediate layer (D2=0) and the thickness (D1) reduction of the display panel result in reduction of the fingerprint recognition region and consequently, there is a problem that enough optical information capable of performing fingerprint recognition is not delivered to the sensor.

Considering the realistic thickness, refractive index and the like of each layer as described below, the size of tan($\theta_A$) may be more than 1 to less than 4, and W may be in a level of about 2 mm to 10 mm. More specifically, using a cellular phone having a length of about 10 to 15 cm or so in front of the device as an example, the minimum one direction length W of the fingerprint contact part required for fingerprint recognition may be 5 mm, where if the thickness (D1) of the display panel is 1.5 mm and tan($\theta_A$) is about 2.5 or so, it is preferred that the thickness (D2) of the intermediate layer is about 0.5 mm or so.

As described above, the fingerprint recognition system of the present application is manufactured by attaching a chip to a completed display panel, and thus there is an advantage that a sufficient fingerprint recognition region can be secured while providing a thin display panel.

While the light of the second angle ($\theta_A$) transmitted through the interface of the intermediate layer and the first light control part as described above is transmitted through the intermediate layer to be incident on the display panel, it may be incident on the display panel as the light ($L_B$) of a third angle ($\theta_B$) equal to or different from the second angle ($\theta_A$). Then, the system may be configured such that the light of the third angle ($\theta_B$) is transmitted at the ridge of the fingerprint, which is a contact part of the display panel and the fingerprint, and totally reflected at the valley of the fingerprint, which is a non-contact part of the display panel and the fingerprint. The system of the present application may be configured such that the totally reflected light at the valley portion of the fingerprint may again reach the sensor via the intermediate layer and the light control layer (second light control section). At this time, the light of the third angle ($\theta_B$) at the ridge of the fingerprint or at the interface between the ridge of the fingerprint and the fingerprint contact part can be scattered and/or reflected as well as transmitted.

Specifically, it is determined according to the fingerprint pattern that contacts the fingerprint contact part of the display panel whether or not the light of the third angle ($\theta_B$) incident on the display panel is totally reflected at the upper surface of the display panel. For example, the system may be provided such that the light of the third angle ($\theta_B$) incident to the display panel satisfies the following relational expressions 3 and 4.

$$\theta_B > (180°/\pi) \times \sin(n_0/n_1) \qquad \text{[Relational Expression 3]}$$

Relational Expression 3 above exemplarily defines the condition that the light of the third angle ($\theta_B$) is totally reflected from the upper surface (interface between air and the display panel fingerprint contact part, or interface between the valley portion of the fingerprint and the display panel fingerprint contact part) of the display panel in contact with air. In Relational Expression 3 above, $n_0$ is 1 as the refractive index of air, and $n_1$ is the refractive index of the display panel.

$$\theta_B < (180°/\pi) \times \sin(n_h/n_1) \qquad \text{[Relational Expression 4]}$$

When the fingerprint is in contact with the display panel, Relational Expression 4 above exemplarily defines the condition that the light of the third angle ($\theta_B$) is transmitted at the upper surface of the display panel (interface of the fingerprint ridge and the fingerprint contact part) in which the display panel is in direct contact with the fingerprint without being totally reflected (or transmission, scattering, and reflection can occur simultaneously). In Relational Expression 4 above, $n_1$ is the refractive index of the display panel (or the display panel including the fingerprint contact part), and $n_h$ is the refractive index of the fingerprint portion in direct contact with the display panel when the fingerprint contacts the display panel. At this time, the fingerprint region directly contacting the display panel may be a ridge as in FIG. 1. On the other hand, the valley portion of the fingerprint is occupied by air, and thus the refractive index of the valley portion can be regarded as 1 ($=n_0$). As such, when no fingerprint is present on the display panel, the light of the third angle ($\theta_B$) is totally reflected at the interface between the transparent base layer and the air, but when the fingerprint is in contact with the display panel, it is transmitted at the ridge which is a direct contact part of the fingerprint (or transmission and scattering, and reflection can occur simultaneously), whereby the light totally reflected at the valley of the fingerprint can be provided in the system of the present application so that it can be used for fingerprint recognition.

In addition, in an example according to the present application, the system may be provided so that the light of the third angle ($\theta_B$) totally reflected from the upper surface (fingerprint contact part) in contact with the air may be transmitted through the intermediate layer.

In one example, when the refractive index of the display panel is greater than the refractive index of the intermediate layer, the total reflection should not occur at the upper surface of the intermediate layer, that is, the interface between the display panel and the intermediate layer, so that the light of the third angle ($\theta_B$) may satisfy the following relational expression 5.

$$\theta_B < (180°/\pi) \times \sin^{-1}(n_2/n_1) \qquad \text{[Relational Expression 5]}$$

When the refractive index of the display panel is greater than the refractive index of the intermediate layer, Relational Expression 5 above exemplarily defines the condition that the total reflection does not occur at the interface between the display panel and the intermediate layer, and the light of the third angle ($\theta_B$) may be transmitted through the upper surface of the intermediate layer. In Relational Expression 5 above, $n_1$ is the refractive index of the display panel, and $n_2$ is the refractive index of the intermediate layer, wherein $n_1$ may be larger than $n_2$.

The light incident on the intermediate layer along the above-described light path may be incident on the second light control part as the light having a fourth angle ($\theta_B'$) equal to or different from the third angle ($\theta_B$). Then, the light of the fourth angle ($\theta_B'$) is transmitted to the lower surface of the second light control part by the second light control part, and the transmitted light ($L_{out}$) may be recognized by the sensor located on the lower part of the second light control part.

As such, the system of the present application can recognize a user's fingerprint in a manner that identifies a light quantity difference between 'the light totally reflected at the interface of the display panel in contact with air (that is, the fingerprint contact part of the display panel) and incident on the sensor' and 'the light having a very little quantity of the incident on the sensor due to transmission (or transmission, scattering and reflection can occur simultaneously) at the direct contact part of the display panel and the fingerprint,' among the light of the third angle ($\theta_B$) resulting from the light of the second angle ($\theta_A$) transmitted from the first light control part.

In one example, the system may further comprise a light source part located below the first light control part. The light source part means a configuration capable of radiating light toward the first light control part. That is, the first light control part may convert the light incident at the first angle ($\theta_O$) from the light source part into light having a second angle ($\theta_A$) different from the first angle ($\theta_O$) toward the intermediate layer and transmit the light.

The specific configuration of the light source part is not particularly limited.

In one example, in consideration of the facts that the visible light source may change the display image quality and the ultraviolet light source may have very low transmittance to the display panel, the light source part may have a configuration capable of radiating infrared rays.

In one example, the light source part may have a size of 4 to 25 mm². In addition, the light source may radiate infrared rays in a range of 1 to 500 mW.

In one example, when the light source part radiates infrared rays, the intermediate layer may have a configuration coated with an ultraviolet or visible light blocking filter. When the blocking filter is coated, it may block light leaking from the display panel toward the rear surface of the display finely or external sunlight, thereby increasing the contrast ratio of the fingerprint image recognized by the filter located below the intermediate layer.

If it is located below the first light control part, the presence or absence of a third configuration between the first light control part and the light source part does not matter. For example, a separate configuration may also exist between the first light control part and the light source part, or these configurations may also be spaced apart from each other and positioned without any separate configuration. Alternatively, the first light control part and the light source part may be in direct contact with each other, so that the light source part may be directly positioned on the lower surface of the first light control part.

In one example, the light incident on the first light control part from the light source may be vertical to the lower surface of the first light control part. In the present application, the term "vertical" means a substantial verticalness in a range that does not impair the desired effect, which is used, for example, in consideration of manufacturing error or variation, and the like. At this time, the error or variation may be within 10°, within 8°, within 6°, within 4°, within 2°, within 1°, within 0.5°, within 0.2°, or within 0.1°. When the light vertical to the lower surface of the first light control part from the light source (that is, the normal reference angle $\theta_O=0°$ to the display panel) is incident on the first light control part as above, the second angle ($\theta_A$) of the light transmitted from the first light control part may be in a range of more than 420 to less than 90°, or 45 to 75°, considering the realistic refractive index of each layer or the thickness of each layer.

In one example, the areas of the light control layer and the intermediate layer may be the same or different. For example, the area of the light control layer may be the same as the area of the intermediate layer, and it may be smaller or larger than that. In the present application, the "area" may mean, on observing it from the upper part or the lower part in a direction parallel to the normal direction of the surface of each constitution of the system forming layers, an area in which the relevant constitution is viewed, and for example, an orthogonal projection area. Therefore, the increase or decrease of the actual area due to the unevenness of the constitution targeted for area comparison or the like is not considered.

In one example, the areas of the first light control part and the light source part may be the same or different. For example, the area of the first light control part may be the same as the area of the light source part, or may be smaller or larger than that.

In one example, the first light control part may have an area equal to or greater than the area of the light source part. When the area relationship is satisfied, the light incident on the lower surface of the first light control part from the light source can be efficiently used for fingerprint recognition.

In one example, the system may further comprise a sensor part located below the second light control part. The sensor part may mean a configuration for detecting and/or identifying light transmitted through the second light control part after being totally reflected at the display panel. That is, the second light control part may transmit light incident on the upper surface of the second light control part at a fourth angle ($\theta_B'$) to the sensor part.

Various kinds of known sensors can be used without limitation as long as the above function can be performed. In one example, when the light source part is an infrared light source, the sensor part may be a sensor coated with an ultraviolet or visible light blocking filter. In this case, the contrast ratio of the fingerprint image recognized by the sensor may be increased by blocking the light leaking to the rear of the display panel finely or external sunlight.

In one example, the sensor part may have an effective area of 5 to 100 mm².

If it is located below the second light control part, the presence or absence of a third configuration between the second light control part and the sensor part does not matter. For example, a separate configuration may also exist between the second light control part and the sensor part, or these configurations may also be spaced apart from each other and positioned without any separate configuration. Alternatively, the second light control part and the sensor part may be in direct contact with each other, so that the sensor part may be directly positioned on the lower surface of the second light control part.

In one example, the second light control part may have a configuration that it converts the light incident on the upper surface of the second light control part to the vertical light and transmits it to the sensor part.

In one example, the areas of the second light control part and the sensor part may be the same or different. For example, the area of the second light control part may be the same as the area of the sensor part, or may be smaller or larger than that.

In one example, the sensor part may have an area equal to or greater than the area of the second light control part. When the area relationship is satisfied, the light transmitted through the second light control part may be efficiently used for fingerprint recognition.

In one example, the chip may comprise an intermediate layer, a light control layer, and a light source part. For example, as described above, the light source part may be positioned on the lower surface of the first light control part.

In one example, the chip may comprise an intermediate layer, a light control layer, and a sensor part. For example, as described above, the sensor part may be positioned on the lower surface of the second light control part.

In one example, the chip may comprise an intermediate layer, a light control layer, a light source part, and a sensor part. For example, as described above, the light source part and the sensor part may be positioned on the lower surface of each light control part, and for example, they may form one layer together.

According to one embodiment of the present application, in order to provide such a light path, the system of the present application may be configured or provided as follows.

In one example, the first light control part and the second light control part may each comprise a diffractive optical element or a refractive optical element.

The refractive optical element may mean an element having a characteristic in which the traveling direction or angle of light is determined by the refractive index difference with the adjacent medium. When the light control part of the present application is a refractive optical element, the light control part may be configured in consideration of refractive indexes between the respective layers so as to satisfy the light path described in the present application.

The diffractive optical element may mean an element having a characteristic in which the traveling direction or angle of light is determined by the shape of the pattern and the spacing between the patterns. When the light control part of the present application is a diffractive optical element, the light control part may be configured in consideration of refractive indexes between the respective layers and diffraction patterns so as to satisfy the light path described in the present application.

In one example, the light control layer of the present application may comprise a diffractive optical element. Specifically, the first light control part and the second light control part may comprise diffractive optical elements having different functions from each other, where the diffractive optical element may be a holographic optical element (HOE) in the form of a film. The holography is a technique for recording an interference pattern in a photosensitive medium to reproduce a three-dimensional image called a hologram. Also, the holographic film may mean a film on which a holographic recording is recorded, and may mean a film capable of recording an interference pattern on a film having very small photosensitive particles using recording light and reproducing it using reproduction light. Since the holographic film may perform the function only for the recorded light and may not perform the required function for light other than the recorded light, when the holographic film is used for the first light control part and the second light control part, it is particularly advantageous to adjust the angle, the light path and/or the light quantity of light required in the present application.

The holographic film may comprise a photosensitive material as a recording medium. As the photosensitive material, a photopolymer, a photoresist, a silver halide emulsion, a dichromated gelatin, a photographic emulsion, a photothermoplastic or a photorefractive material, and the like can be used. In one example, the holographic film may comprise a photopolymer as a photosensitive material, and may be, specifically, a film consisting only of a photopolymer, or a film with a double-layered structure comprising a photopolymer layer and a substrate for the layer together. In this case, the substrate used together with the photopolymer may be a transparent substrate and may be, for example, a substrate comprising polycarbonate (PC), polypropylene (PP), polyamide (PA), polyethylene terephthalate (PET) or triacetyl cellulose (TAC), and the like, but is not particularly limited.

In one example, the diffraction efficiencies of the first light control part and the second light control part may be the same or different from each other. Specifically, the first light control part may have the same diffraction efficiency in its entire area and the second light control part may also have the same diffraction efficiency in its entire area, where the diffraction efficiencies of the respective light control parts may be the same or different from each other.

In one example, the first light control part and the second light control part may be some regions formed by changing only angles or diffraction patterns of recording light on one layer, respectively. Alternatively, the light control layer may also be formed by directly attaching the first light control part and the second light control part or by attaching them via another medium, so that the first light control part and the second light control part, which are separately manufactured, may form a single layer.

When the transmittance described above is satisfied, the kind of the intermediate layer having transparency is not particularly limited. For example, it may comprise glass or a polymer resin. As the polymer resin, a polyester film such as PC (polycarbonate), PEN (poly(ethylene naphthalate)) or PET (poly(ethylene terephthalate)), an acrylic film such as PMMA (poly(methyl methacrylate)) or a polyolefin film such as PE (polyethylene) or PP (polypropylene) may be used, without being limited thereto. In one example, the intermediate layer may have a constitution in which a number of glass or polymer resins are laminated. Even in the case of having such a laminated constitution, the intermediate layer may be provided so as to perform the functions required in the present application and satisfy the described relational expressions.

In one example, the display panel, the intermediate layer, the light control layer and their detailed configurations may each have the same or different refractive index from each other. For example, the layers may each independently have a refractive index in a range of more than 1 to 3 or less. In the case of the display panel comprising various materials, the refractive index is different depending on the surface or the inside region, but it may have a refractive index within the above range roughly. In the present application, the refractive index may mean a refractive index for ultraviolet rays, visible rays, or infrared rays. The visible rays may have a wavelength in a range of about 380 nm to 780 nm, and the ultraviolet or infrared rays may have a wavelength outside the above range. For example, the ultraviolet rays may have a wavelength in the range of about 1 to 380 nm, and the infrared rays may have a wavelength in the range of 780 nm to 1 mm.

Although the refractive index may change with light, the degree of change in the refractive index is not large. In one example, the layers may each have a refractive index in a range of 1.4 to 1.75, 1.4 to 1.70, or 1.45 to 1.65. Although not particularly limited, the refractive index difference between the layers may be 0.0001 to 1.5 or less, or 0.0001 to 1 or less. In the case of the light control layer, the refractive indices of the first light control part and the second light control part may be adjusted to be the same or different, within the range capable of performing the function required in the present application. Even when the fingerprint contact part included in the display panel has the form of a film as described below, it may have the above-described refractive index.

The specific thicknesses of the display panel, the intermediate layer, and the light control layer are not particularly limited as long as Relational Expression 1 or the like is satisfied.

For example, the display panel may have a thickness of about 3.0 mm or less, about 2.5 mm or less, about 2.0 mm or less, or about 1.5 mm or less. At this time, the thickness of the display panel may be a thickness in a state where the fingerprint contact part having a thickness of about 1.5 mm or less, about 1.0 mm or less, about 0.5 mm or less, or about 0.3 mm or less is included, and the fingerprint contact part having the thickness may be a functional film such as a hardness reinforcing film as described below. The lower limit of the thickness may be, for example, a minimum size configured so as to be capable of performing a function as a display panel, which is not particularly limited.

Also, for example, the intermediate layer may have a thickness of about 3.0 mm or less, about 2.5 mm or less, about 2.0 mm or less, or about 1.5 mm or less. The thickness lower limit of the intermediate layer is not particularly limited as long as it does not limit the function of each configuration as described above. For example, it may be 0.01 mm or more, or 0.1 mm or more.

Furthermore, for example, in the case of the light control layer, it may have a thickness of about 2.0 mm or less, or about 1.5 mm or less, and for example, a thickness of 1,000 μm or less, 500 μm or less, 300 μm or less, 300 μm or less, or 100 μm or less.

In one example, the fingerprint contact part is a region exposed to the external environment in the system of the present application, which may be a portion formed of a functional film. For example, the fingerprint contact part of the display panel may comprise one or more functional films selected from the group consisting of a hardness reinforcing film, an antifouling film, a decor film, and an antireflection film. For example, a hardness reinforcing film such as glass may be positioned on the surface layer of the display panel. Even when such a functional film is included, the fingerprint contact part is selected so as not to obstruct the light path required in the present application, whereby the system of the present application may perform the above-described objects.

In the present application, the configuration or type of the display panel is not particularly limited, and for example, a known LCD (liquid crystal display), OLED (organic light emitting diode), or IGZO (indium gallium zinc oxide) may be used.

In one example, the display panel, the intermediate layer and the light control layer may maintain an adhesion state through a predetermined pressure-sensitive adhesive layer. Even in the case of having such a pressure-sensitive adhesive constitution, the display panel, the intermediate layer, and the light control layer may be provided so that the function required in the present application is performed and the following relational expressions are satisfied. For reference, when compared to the thicknesses of the display panel, the intermediate layer and the light control layer, the pressure-sensitive adhesive layer has a very slight thickness in a level of about 1/10 to 1/1,000, a level of 1/50 to 1/150, a level of 1/80 to 1/120 or a level of 1/100, so that it does not act as a factor limiting the above-described light path. Furthermore, in order not to limit the above-described light path, the refractive index of the pressure-sensitive adhesive layer may also be adjusted at the refractive index level of each of the above-described configurations. The kind or composition of the pressure-sensitive adhesive layer is not particularly limited, and it may be, for example, an acrylic pressure-sensitive adhesive layer or a silicone pressure-sensitive adhesive layer.

In another example of the present application, the present application relates to a mobile device comprising the fingerprint recognition system. The type of the mobile device is not particularly limited, and it may be, for example, a smartphone, a tablet PC, a PDA device, or a notebook computer, in which the device comprising the display panel has a thickness of less than 5 cm, less than 4 cm, or less than 3 cm.

In one example, the device may be a so-called bezel-less device. In the present application, the bezel-less means a case where the area occupied by the bezel, which is a non-display part, is extremely small on the front of the device that a user can recognize the screen. For example, the area of the display part on the front of the device may be 90% or more, or 95% or more.

Figure 3:
FIG. 3 is an image of a fingerprint photographed using a system according to one example of the present application.

FIG. 3 is an image of a fingerprint photographed using a system according to one example of the present application. Specifically, a fingerprint recognition chip comprising a light control layer (thickness of about 70 μm) including a first light control part and a second light control part, and including a holographic film having a refractive index of about 1.5 for an infrared wavelength of about 850 nm; and a transparent acrylic substrate (intermediate layer) (thickness of about 1 mm) having a refractive index of about 1.5 for an infrared wavelength of about 850 nm was prepared. The fingerprint recognition chip was attached to the lower part of a display panel (transmittance of about 1% for visible light) having a total thickness of 1.5 mm in a state where a cover glass (fingerprint contact part) was included, and a fingerprint recognition system having the laminated configuration as in FIG. 2(a) was produced. Then, a light source part made it possible to irradiate the light control layer with the light having a wavelength of about 850 nm. At this time, as the first light control part, a diffractive optical film was used, in which diffraction patterns were recorded so that the incident light of the light source part incident at 0° on the lower surface of the first light control part could be transmitted at 65°, based on the normal to the display panel, and as the second light control part, a diffractive optical film was used, in which diffraction patterns were recorded so that the incident light from the upper surface could be transmitted at an angle of 0° (that is, an angle vertical to the lower surface of the second light control part), based on the normal to the display panel. FIG. 3 is an image obtained by bring a fingerprint into contact with the cover glass and photographing the image appearing in the lower part of the second light control part with a CCD (charge-coupled device) in the device having the above configuration.

As described above, the inventions of the present application have been described with reference to FIGS. 1 to 3, which are exemplary examples of the present application, but the protection scope of the present application is not limited to the above-specified example and drawings. In addition, those having ordinary knowledge in the technical field to which this technical field belongs will understand that the inventions described in the claims may be variously changed or modified within the technical idea and scope of the present invention.

The invention claimed is:
1. A fingerprint recognition system comprising:
a display panel including a fingerprint contact part; and a fingerprint recognition chip attached to the display panel,
wherein the fingerprint recognition chip comprises a light control layer including a first light control part and a second light control part; and an intermediate layer,
the first light control part is provided so that light incident from the lower surface of the first light control part at a first angle ($\theta_0$) is transmitted toward the intermediate layer as light having a second angle ($\theta_A$) different from the first angle ($\theta_0$), the second light control part is provided so that light incident on the upper surface of the second light control part at a fourth angle ($\theta_B'$) is transmitted to the lower surface of the second light control part, and the intermediate layer is provided so that a region where a fingerprint is recognized on the fingerprint contact part is secured, wherein the intermediate layer has a thickness satisfying Relational Expression 1:

$$W=(D1+D2)\times\tan(\theta_A) \quad \text{[Relational Expression 1]}.$$

wherein, W is a one direction length of a region where fingerprint recognition is made in the system, D1 is the thickness of the display panel, and D2 is the thickness of the intermediate layer.

2. The fingerprint recognition system according to claim 1, comprising the intermediate layer and the light control layer sequentially on the opposite surface of a surface of the display panel having the fingerprint contact part.

3. The fingerprint recognition system according to claim 1, wherein the fingerprint contact part comprises one or more functional films selected from the group consisting of a hardness reinforcing film, an antifouling film, a decor film and an antireflection film.

4. The fingerprint recognition system according to claim 1, wherein the system has a fingerprint recognition region on a region of a display part in the display panel.

5. The fingerprint recognition system according to claim 1, wherein the system is provided so that the light of the second angle ($\theta_A$) transmitted from the first light control part is transmitted through the lower surface of the intermediate layer.

6. The fingerprint recognition system according to claim 5, wherein the system is provided so that the light of the second angle ($\theta_A$) transmitted from the first light control part is transmitted through the lower surface of the intermediate layer by satisfying Relational Expression 2:

$$\theta_A<(180°/\pi)\times\sin^{-1}(n_2/n_3) \quad \text{[Relational Expression 2]}$$

wherein, $n_2$ is the refractive index of the intermediate layer, and $n_3$ is the refractive index of the first light control part or the second light control part in the light control layer, and $n_3$ is larger than $n_2$.

7. The fingerprint recognition system according to claim 5, wherein the system is provided such that the light incident on the lower surface of the intermediate layer at the second angle ($\theta_A$) is incident on the display panel at a third angle ($\theta_B$) equal to or different from the second angle ($\theta_A$), such that the light of the third angle ($\theta_B$) is totally reflected at the interface of the fingerprint contact part in contact with air by satisfying Relational Expression 3, and such that the light of the third angle ($\theta_B$) is transmitted at the interface of the fingerprint contact part at which the fingerprint and the display panel are in direct contact with each other, by satisfying Relational Expression 4:

$$\theta_B>(180°/\pi)\times\sin^{-1}(n_0/n_1) \quad \text{[Relational Expression 3]}$$

$$\theta_B<(180°/\pi)\times\sin^{-1}(n_h/n_1) \quad \text{[Relational Expression 4]}$$

wherein, $n_0$ is 1 as the refractive index of air, $n_1$ is the refractive index of the display panel, and $n_h$ is the refractive index of the fingerprint portion which in direct contact with the fingerprint contact part.

8. The fingerprint recognition system according to claim 7, wherein the system is provided so that the light of the third angle ($\theta_B$) totally reflected at the interface of the fingerprint contact part in contact with air is transmitted through the upper surface of the intermediate layer.

9. The fingerprint recognition system according to claim 8, wherein the system is provided so that the light of the third angle ($\theta_B$) totally reflected at the interface of the fingerprint contact part in contact with air is transmitted through the upper surface of the intermediate layer by satisfying Relational Expression 5:

$$\theta_B<(180°/\pi)\times\sin^{-1}(n_2/n_1) \quad \text{[Relational Expression 5]}$$

wherein, $n_1$ is the refractive index of the display panel, $n_2$ is the refractive index of the intermediate layer, and $n_1$ is larger than $n_2$.

10. The fingerprint recognition system according to claim 1, further comprising a light source part positioned below the first light control part, wherein the first light control part is provided so as to transmit the light incident at the first angle ($\theta_0$) from the light source part toward the intermediate layer as the light having a second angle ($\theta_A$) different from the first angle ($\theta_0$).

11. The fingerprint recognition system of claim 10, wherein the light source part is provided so as to emit the light vertical to the lower surface of the first light control part.

12. The fingerprint recognition system according to claim 10, further comprising a sensor part positioned below the second light control part, wherein the second light control part is provided so as to transmit the light incident on the upper surface of the second light control part at a fourth angle ($\theta_B'$) to the sensor part.

13. The fingerprint recognition system according to claim 12, wherein the second light control part converts the light incident on the upper surface into the light vertical to the lower surface of the second light control part and transmits the vertical light to the sensor part.

14. The fingerprint recognition system according to claim 12, wherein the light source part radiates infrared rays.

15. The fingerprint recognition system according to claim 14, wherein the intermediate layer is coated with an ultraviolet or a visible light blocking filter.

16. The fingerprint recognition system according to claim 15, wherein the sensor part is coated with an ultraviolet or a visible light blocking filter.

17. The fingerprint recognition system according to claim 1, wherein the first light control part and the second light control part each comprise a diffractive optical element or a refractive optical element.

18. The fingerprint recognition system according to claim 17, wherein the first light control part and the second light control part each comprise a holographic film.

19. A mobile device comprising the fingerprint recognition system according to claim 1.

20. The mobile device according to claim 19, having a bezel-less feature that the area of the display part on the front of the device is 90% or more.

* * * * *